(No Model.)
J. STREICHER & V. HOEHL.
Meat Cutter.
No. 239,118. Patented March 22, 1881.
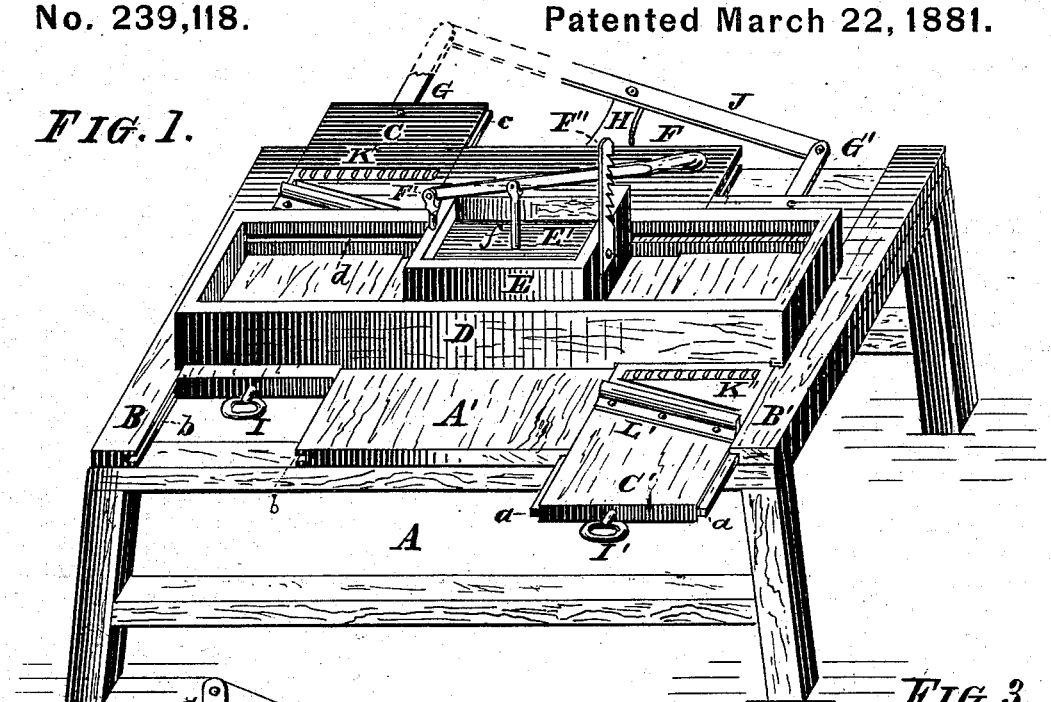
FIG. 1.
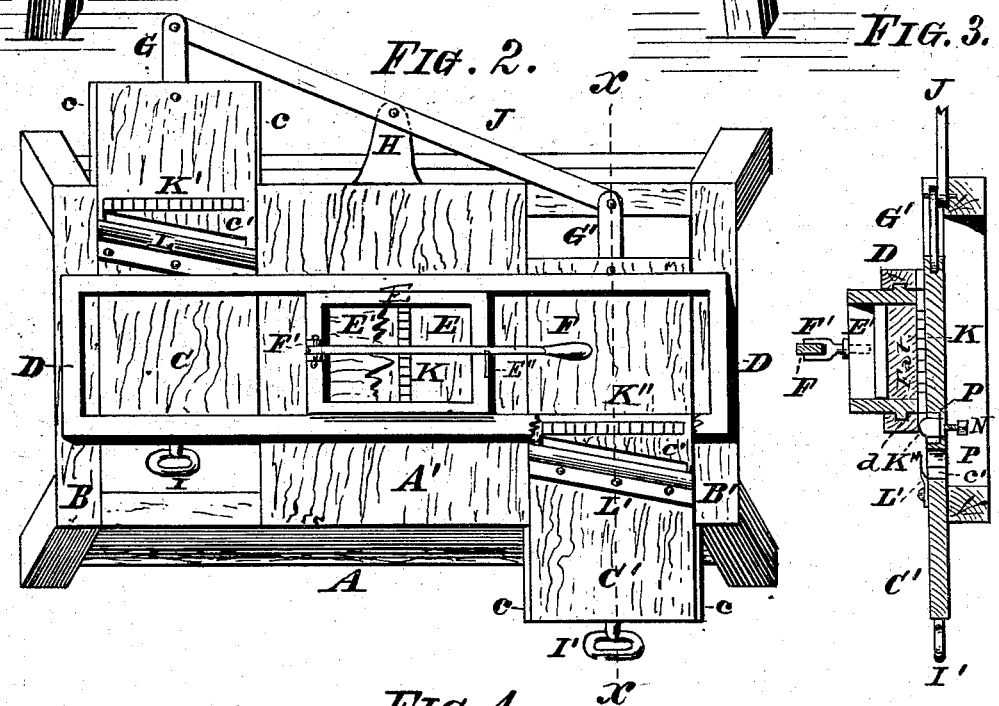
FIG. 2.    FIG. 3.
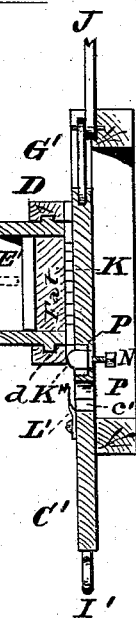
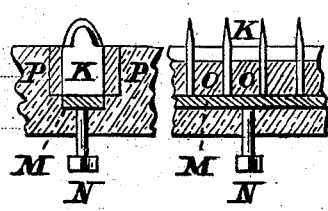
FIG. 4.
Witnesses:
Willie O. Stark
Al. Stark
Inventors:
Jacob Streicher,
Valentine Hoehl,
by Michael J. Stark,
Attorney.

United States Patent Office.

JACOB STREICHER AND VALENTINE HOEHL, OF BUFFALO, NEW YORK.

MEAT-CUTTER.

SPECIFICATION forming part of Letters Patent No. 239,118, dated March 22, 1881.

Application filed January 31, 1881. (No model.)

*To all whom it may concern:*

Be it known that we, JACOB STREICHER and VALENTINE HOEHL, of Buffalo, in the county of Erie and State of New York, have jointly invented certain new and useful Improvements on a Machine for Cutting Fat, &c., into Slices or Cubes; and we do hereby declare that the following description of our said invention, taken in connection with the accompanying sheet of drawings, forms a full, clear, and exact specification, which will enable others skilled in the art to which it appertains to make and use the same.

This invention has general reference to machines for cutting fat or pork into cubes; and it consists, essentially, in the combination, with a suitable stand or frame, of a receptacle for the fat, said receptacle being moved in suitable guideways over a set of slicing or cutting knives, which incise the fat longitudinally, after which a slide carrying another set of incisors and a shaving or cutting knife is moved under the box transversely, so as to incise the fat in lines at right angles to the first lines of incision, and then to shave or cut the part so incised away from the main body of the fat, whereby cubical pieces of fat or pork are produced, all as hereinafter more fully set forth and described, and then pointed out in the claims.

In the drawings already referred to, which serve to illustrate our invention more fully, Figure 1 is a perspective view of our improved machine. Fig. 2 is a plan of the same. Fig. 3 is a sectional elevation in line $x\ x$ of Fig. 2. Fig. 4 is a detached view of the incisor-knives used in our machine.

Like parts are designated by corresponding letters of reference in all the figures.

A in these drawings represents a frame, of any suitable construction, carrying a platform, A', and two rails, B B', said platform and rails being grooved at $b$ to admit and guide between them two slides, C C', respectively. Upon this platform A' is fixed transversely, and reaching from the rail B to the rail B', a box or other shaped guiding device, D, arranged to receive a box-shaped receptacle, E. This receptacle, which serves as a receiver for the pork, fat, &c., to be cut, is moved between the guides D from the right to the left and back again over the slides C C'. Upon the platform A' is furthermore placed a series of knives or incisors, K, Fig. 2, (shown in detail in Fig. 4,) projecting above the plane or top surface of said platform a sufficient distance so as to penetrate into and incise the fat, &c., in the receptacle E the desired depth. In the slides C C' there is another series of knives or incisors, K' K", set at right angles to those in the platform A', and a shaving or slicing knife, L L', respectively, the two sets of knives in said slides being so arranged as to cut in the same direction, as will hereinafter be made to appear.

The incisor-knives K consist each of a blade of steel curved and sharpened on its upper edge, said blades being inserted into a metal-lined mortise, P, in the slides and platform, together with liners O, which separate the knives the desired distance.

The shaving-knives L L' consist each of a blade of steel having a curved transverse section, so as to bring their cutting-edge above and their rear part upon the slides C C', so that the elevation of the cutting-edge corresponds to the thickness of the slices to be cut by said knives. These knives are set obliquely to the line of motion of said slides, so as to produce a so-called "draw-cut," and they are placed over openings $c'$ in said slides, to enable the pieces cut from the bulk of the substance in the receptacle E to pass through said slides into receivers placed underneath the slides. The knives L L' are placed directly in rear of the incisors K' K"—that is to say, they are so placed that the incisors K' K" will cut the substance first, and the knives L L' then sever the parts so cut by the incisors from the bulk of the substance in said receptacle E.

A follower, M, in conjunction with adjusting-screws N, serves to elevate the incisors as wear from grinding, &c., occurs and renders readjustment necessary.

To the platform or frame is fixed an arm, H, serving as a fulcrum for a lever or walking-beam, J, connecting the two slides C C' by means of links G G'.

Within the receptacle E is a follower, E', connected with a lever or other mechanism, F, pivoted at F' by a rod or other means, $f$.

In operation, one of the two slides C C' is taken hold of by the handles I or I' and pulled toward the operator of the machine, so as to bring the incisors K' or K" and knives L or L' outside of the guides D. Now the receptacle E is moved over, say, the slide C, and filled with the substance or article to be cut into cubes or slices, and the follower E' placed upon the same. This being accomplished, the receptacle E is moved toward the right or slide C'. In doing this it passes over the incisors K, which cut grooves into the under side of the fat, &c. The box E being over the slide C', the latter is pushed from the operator, so that the incisors K" and then the slicing-knife L' will pass underneath the fat, &c., in the box E, and first groove the same at right angles to the incisions made by the knives K, and then slice off the portion so incised, which portion passes through an aperture, c', in the slide C' in the form of small cubes. Now the lever F is depressed one notch in the rack-bar E" to push the fat in the box E down upon the slide C', after which said box E is moved toward the left over the incisors K toward and upon the slide C. This slide is then pushed away from the operator and the cutting or slicing repeated. In this manner a continuous operation is effected which is best carried on by two operators, one on each side, although one operator alone can very well manipulate the machine.

The principal object of our present invention is the production of a machine for cutting the fat used in sausages into cubical form, which, as far as we are aware, has heretofore been exclusively done by hand with knives, and is a very laborious method of producing the desired result; but in addition to this purpose our machine may with advantage be used for cutting beets, carrots, and other vegetable substances into either cubes or slices to prepare them for food. To cut these substances into slices, either the incisors in the platform A' or those in the slides C C' are removed, so as to incise said substances in one direction only, after which the knives L L' will slice the pieces in a manner readily comprehended.

It may here be stated that the operation described may be performed with one slide, C, instead of two of such slides, by moving the receptacle E first away from the said slide over the incisors K and then back again upon said slide.

Still another modification would be to make the incisors K' K" and slicing-knives L L' permanent, or rather stationary, and to provide for guides for the receptacle E at right angles to the guides D, and then to move said receptacle alternately upon the slides C C' and over the incisors K.

Having thus fully described our invention, we claim as new and desire to secure to us by Letters Patent of the United States—

1. In a machine for cutting fat, pork, and other substances into cubical form, the platform having the guides, the receptacle, and the slide or slides, said platform being provided with a series of upwardly-projecting adjustable incisors and said slide or slides with a series of incisors and a paring-knife, said receptacle being adapted to be moved over the incisors and the slide underneath said receptacle, as and for the object specified, the whole being constructed and combined substantially in the manner as stated.

2. In machines for cutting fat, &c., into cubical pieces, two slides, each having a set of incisor-knives and a paring-knife, in combination with a receptacle for the article to be cut and a set of incisors at right angles to the before-mentioned incisor-knives, substantially as and for the purpose stated.

In testimony that we claim the foregoing as our invention we have hereto set our hands in the presence of two subscribing witnesses.

JACOB STREICHER.
VALENTINE HOEHL.

Attest:
  MICHAEL J. STARK,
  FRANK HIRSCH.